United States Patent [19]

Olsson et al.

[11] Patent Number: 5,143,775

[45] Date of Patent: Sep. 1, 1992

[54] SHOCK-ABSORBING WRAPPING AND A METHOD FOR MANUFACTURING SUCH WRAPPING

[75] Inventors: Roine Olsson, Åkarp; Bo Hellgren, Tyreso, both of Sweden

[73] Assignees: AB Akerlund & Rausing; Electrolux Major and Floor Care Appliances Aktiebolag, both of Sweden

[21] Appl. No.: 355,442

[22] Filed: May 22, 1989

[30] Foreign Application Priority Data

May 30, 1988 [SE] Sweden ............................. 88020037

[51] Int. Cl.$^5$ .............................................. B32B 1/00
[52] U.S. Cl. .................................. 428/178; 53/139.7; 156/145; 156/156; 206/320; 206/453; 206/522; 428/130; 428/166; 428/179; 428/182; 428/184; 264/512; 264/545; 264/547; 264/551
[58] Field of Search ................... 206/522, 453, 320; 428/178, 188, 179, 182, 184, 130, 166; 156/145, 156; 53/139.7, 472; 264/512, 545, 547, 551

[56] References Cited

U.S. PATENT DOCUMENTS

| | | | |
|---|---|---|---|
| 1,853,374 | 4/1932 | Oxhandler | 428/188 |
| 2,020,639 | 11/1935 | Grayson et al. | 428/188 |
| 2,171,805 | 9/1939 | Picard | 428/178 |
| 2,221,310 | 11/1940 | Gazelle | 428/178 |
| 2,670,501 | 3/1951 | Michiels | 156/145 |
| 2,756,032 | 11/1952 | Powell | 428/188 |
| 2,958,620 | 9/1956 | Ono | 428/188 |
| 3,205,891 | 9/1965 | Achner | 428/188 |
| 3,231,454 | 1/1966 | Williams | 428/166 |
| 3,346,101 | 10/1967 | Pestka | 206/522 |
| 3,389,534 | 6/1968 | Pendleton | 206/522 |
| 3,756,884 | 9/1973 | Hagino | 156/145 |
| 3,817,803 | 6/1974 | Horsky | 428/188 |
| 3,889,743 | 6/1975 | Presnick | 206/522 |
| 3,892,902 | 7/1975 | Ilakowicz | 428/166 |
| 4,136,412 | 1/1979 | Wilhelm | 428/178 |
| 4,169,344 | 10/1979 | Ganz et al. | 156/145 |
| 4,314,865 | 2/1982 | Ottaviano | 428/166 |
| 4,349,404 | 9/1982 | Changani et al. | 428/188 |
| 4,412,879 | 11/1983 | Ottaviano | 428/166 |
| 4,427,474 | 1/1984 | Ottaviano | 428/166 |
| 4,482,597 | 11/1984 | Smith | 428/188 |
| 4,486,479 | 12/1984 | F'Geppert | 428/178 |
| 4,576,669 | 3/1986 | Capato | 428/166 |
| 4,950,354 | 8/1990 | Schirmer | 156/145 |

FOREIGN PATENT DOCUMENTS

| | | | |
|---|---|---|---|
| 851154 | 9/1970 | Canada | 428/188 |
| 71891 | 10/1959 | France | 206/522 |
| 2257501 | 1/1974 | France . | |
| 2389547 | 1/1979 | France | 206/522 |
| 0034894 | 3/1977 | Japan | 206/522 |
| 287340 | 2/1965 | Netherlands | 206/522 |
| 908579 | 10/1962 | United Kingdom . | |

Primary Examiner—Patrick J. Ryan
Assistant Examiner—Archene A. Turner
Attorney, Agent, or Firm—Lerner, David, Littenberg, Krumholz & Mentlik

[57] ABSTRACT

A customized shock-absorbing wrapper band comprising at least two rows of gas-filled cushions of arbitrary shape and size formed by joining two flexible webs, at least one of which is thermoformable, and pressurizing the thermoformed recesses when sealing such by the other web in a sealing station of a thermoforming, roller operated machine.

3 Claims, 3 Drawing Sheets

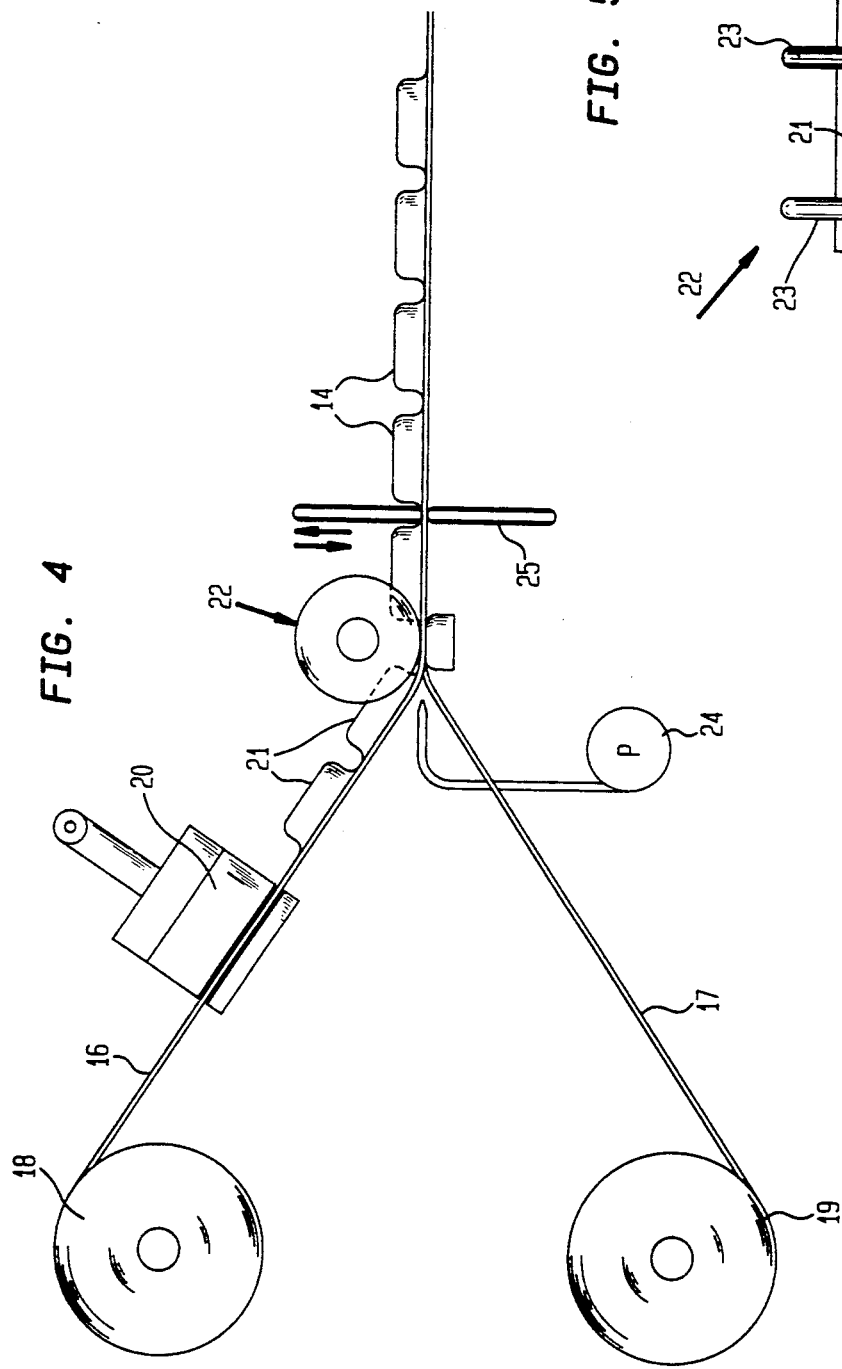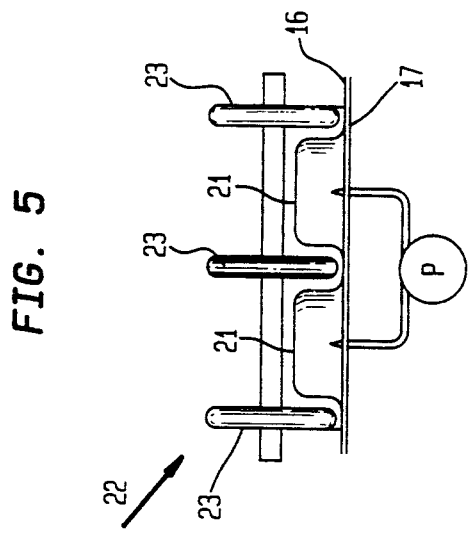

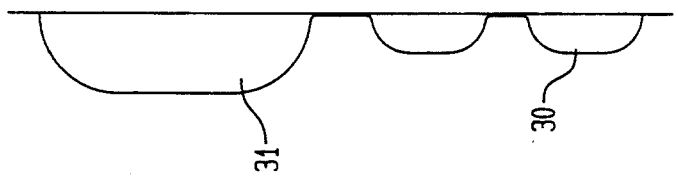
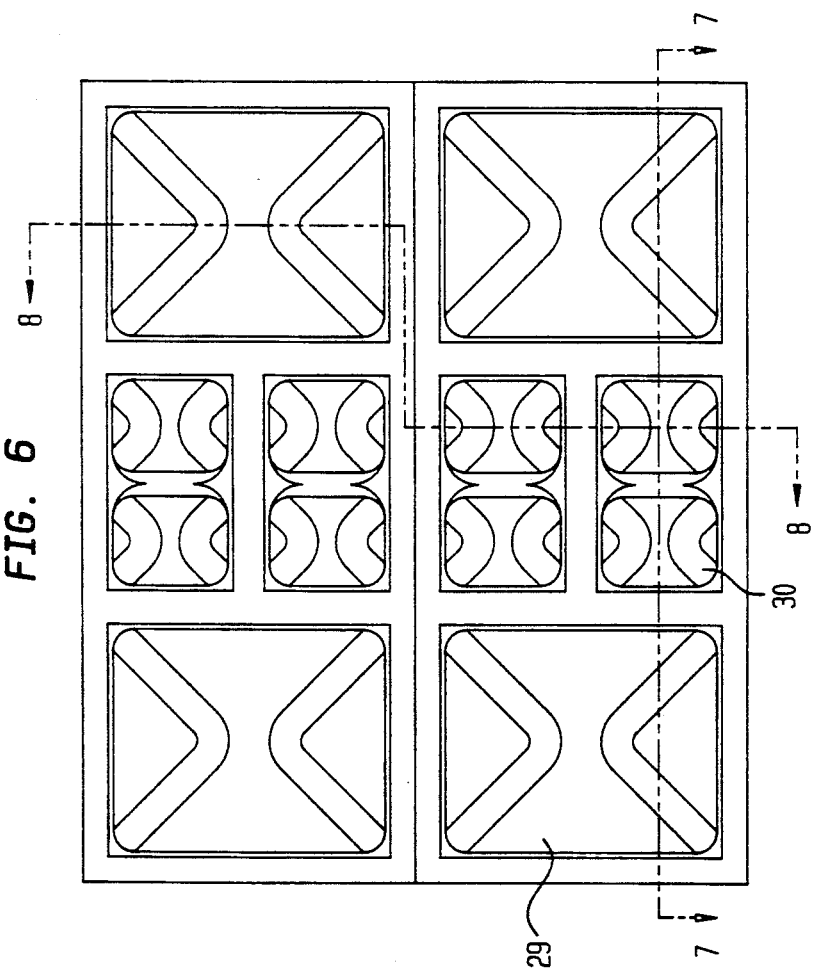
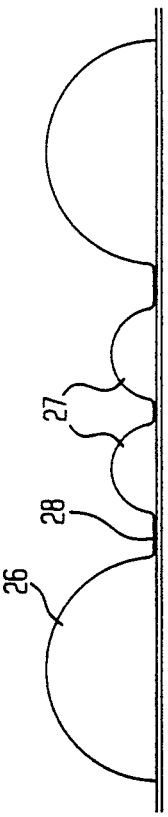

SHOCK-ABSORBING WRAPPING AND A METHOD FOR MANUFACTURING SUCH WRAPPING

FIELD OF THE INVENTION

The present invention relates to a shock-absorbing transport and storage wrapping made from two webs of flexible material, preferably of plastics or plastic laminates, having gas or air filled spaces between said webs.

BACKGROUND AND OBJECTS OF THE INVENTION

Refrigerators and freezers, washing machines and similar prismatic articles are frequently damaged during transport from the manufacturer to the user. Even if the goods is well wrapped, shocks or collisions against other objects may tear or deform the wrapping.

One object of the present invention is to provide a shock-absorbing wrapper which may be applied along corner-portions of the article. This gives a protection not only to the corner as such but the side surface between two corner wrapper strings will be maintained at a certain distance from other objects.

One additional object of the invention is to provide a technique which offers an optimum of transport and storage protection for products wrapped in a wrapping having preformed cavities of individually variable size and shape.

Another object of the invention is to provide an efficient wrapper manufacturing method.

STATE OF THE ART

From the packaging technique within the electronics industry there are known webs having formed therein small (in the size of 10 to 20 mm) spheres filled by air and spaced in a close sphere to sphere-pattern. Such wrappers do provide shock-absorption in combination with an outer protective package, generally a cardboard box. Sheets of said wrappers are simply placed along the planar innersides of the box.

Another known technique makes use of elongated, blown up, air filled, proximate cylindric spaces between the pair of flexible webs. Such technique does also provide a restricted pattern configuration for the protective elements of the wrapping. The configuration may be described as a "nodistance" cylinder to cylinder configuration. The cylinders are so close to each other that the web loses its folding characteristics.

SUMMARY OF THE INVENTION

A shock absorbing wrapper according to the present invention is characterized by two flexible webs, at least one of which is thermoformable, permanently formed and joined such that at least two rows of gas-filled cushions of arbitrary size and shape are formed, the width of the web being such that at least two rows of cushions are separated a distance allowing the rows to be folded relative each other.

A method for manufacturing of a shock-absorbing wrapper of the type comprising two weldable flexible webs is characterized in that series of gas-filled cushions of arbitrary shape and dimension are formed in one of said webs by a thermoforming process in a thermoforming machinery, and that the two webs are moved past stations for length-wise and cross-wise welding, and in that the width of the webs are such and the welding station placed such that at least two rows of cushions are formed, separated by a distance sufficient for allowing the rows of pillows to be folded against each other.

In order to safeguard the protective funtion of the cushions, a gas, preferably air, is blown in between the webs just before the welds of each individual, thermoformed recess are finished.

One article, for instance a freezer, is transferred from a wrapping station on a wooden pallet and is protected by a cardboard wrapper and/or wooden frames. A shock-absorbing wrapper according to the present invention is applied at least along the vertical corner-portions. Thereafter a shrink film is applied around the object, and after being heated the shrink film fixes the freezer, pallet and any wooden frames plus the shock-absorbing corner wrappers.

BRIEF DESCRIPTION OF THE DRAWINGS

FIG. 5 is a cross-section taken from FIG. 4, FIG. 6 is a plan view showing the side of the band having specific cushions according to a second embodiment, FIG. 7 is a section along line VII—VII in FIG. 6, and FIG. 8 is a broken section along line VIII—VIII.

DESCRIPTION OF PREFERRED EMBODIMENTS

Figure 1:
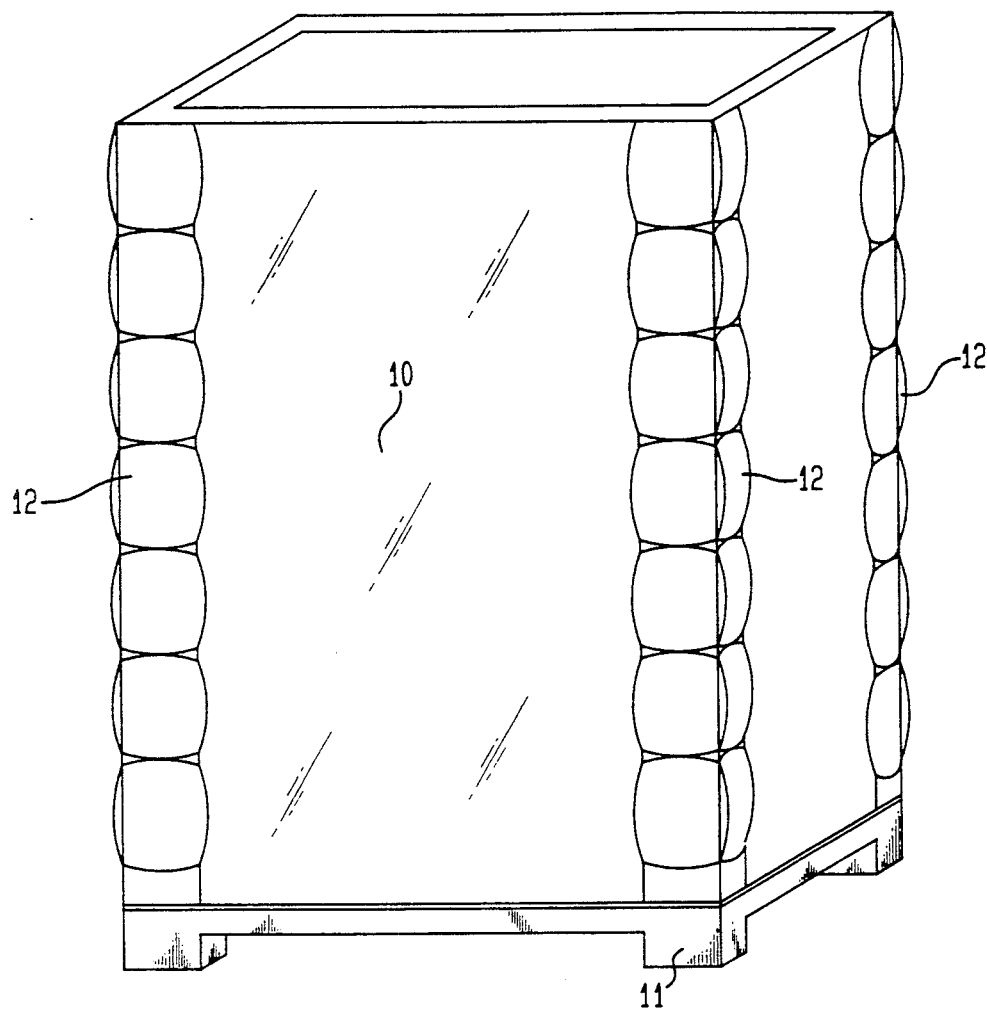
FIG. 1 schematically shows a freezer being wrapped by corner-protection means according to the present invention.

In FIG. 1 the reference numeral 10 denotes an arbitrary, prismatic article, for instance a freezer, which should be wrapped and transported, standing on a pallet 11. In the traditional manner the freezer may be wrapped by corrugated cardboard.

In order to protect the freezer efficiently during the transport, bands of pressurized, thermoformed cushions are attached along the vertical corner-portions of the freezer. Possibly, similar bands may be attached along the upper horizontal corner-portions.

Figure 2:
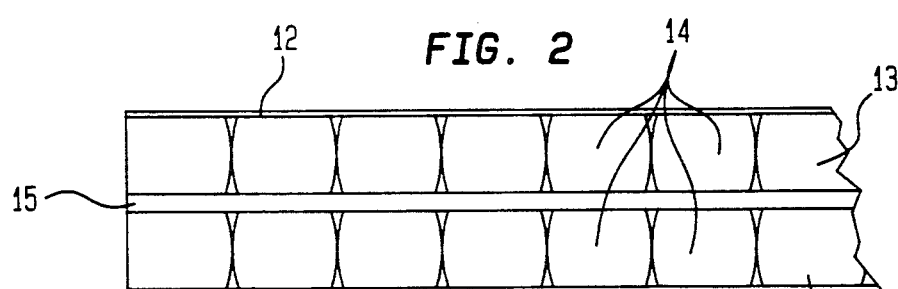
FIG. 2 shows a portion of a wrapper band according to the present invention.
Figure 3:
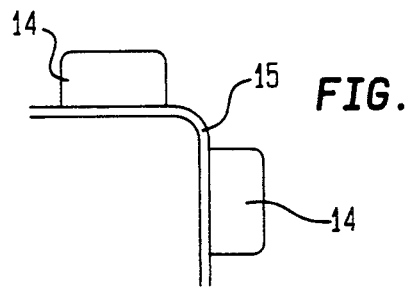
FIG. 3 shows a section through the band, but with the longitudinal portions of the band folded 90° relative each other, FIG. 4 very schematically shows the method of manufacturing the wrapping band.

As appears best from FIG. 2, each band 12 comprises two rows 13 of pillows 14 having four-sided planar shape. The rows of cushions are seperated by a solid strip 15 which is wide enough for allowing folding of the band such that the rows of cushions will be placed 90° relative each other, as shown in FIG. 3.

The bands 12 may be glued to the corrugated cardboard wrapper. In that case where this wrapper is enforced by wooden frames, the band may be stitched to such applications which is best carried out by a robot.

Finally, the entire unit is enclosed within shrinkable plastics which after heating tightens the seperate elements to a unit and forms a reinforced transport protection.

The manufacture of the band is carried out as schematically shown in FIG. 4, where basically a thermoforming machinery is shown operating from a pair of rollers carrying webs of thermoformable material.

Two webs 16, 17 of plastic foil, preferably a LD-polyethylene, are unrolled from rollers 18, 19 and transported generally in a horizontal direction past stations for thermoforming recesses forming bladders after being sealed by the other web. The recesses have a formstable shape also when the bladders are unpressurized. In one embodiment the bladders are given a four-sided planar shape and arranged such that they cover a substantial portion of the surface of the band, only surrounded by the necessary weld seams.

In order to give the cushions a sufficient depth and predetermined lateral dimensions for the intended shock-absorption function, the bladders are permanently thermoformed with a minimum of mechanical memory from at least one of the webs.

At 20 there is shown a station for forming recesses 21 by thermoforming, i.e. a certain portion of the material of the strip is heated and sucked and/or pressed into a mold.

The two bands 16, 17 are thereafter brought to pass a sealing station 22 for longitudinal welding of the webs 16, 17.

In a manner known per se the station 22 may comprise the traditional heat sealing equipment or heated wheels 23 for welding webs along the outer longitudinal edges, as well as between the recesses or bladders 21 so that there is obtained an elongated strip for folding of the webs.

Gas, preferably air, is blown in between the bands 16, 17 from a source for pressurized air 24 immediately before the welding station 22, such that the recesses covered by the other web are safely pressurized by gas before they are sealed to cushions 14 which takes place in the welding station 25 where heated jaws operate in the cross-wise direction between the bladders 21.

The band manufactured in the described manner may be rolled up or folded in a storage, from which it may be taken out as desired, but of course the machinery may operate also intermittently and produce bands as desired and feed such out from the machinery in desired predetermined lengths.

The two rows of gasfilled, pressurized cushions in the embodiment according to FIGS. 1–5 having a square/-rectangular basic shape offer an excellent protection for corner-portions as well as surfaces therebetween. Possibly, both webs may be provided with bladders, and the attachement to the object to be transported may be carried out in different manners. The lower web 17 having no bladders may for instance be provided with a layer of glue covered by a removable protective film.

In FIG. 8 there is shown a tool to be used in a conventional thermoforming machine for forming "bladders" or recesses of basically two different types (or alternatively FIG. 8 may be said to represent a cut piece of a sealed two web wrapper having been thermoformed in said tool).

The section in FIG. 7 shows two different types for the bladders 26, 27 and a certain region 28 therebetween where the two webs are sealed.

The reference numerals 29, 30 represent folding denotations for facilating the folding of the piece of band, generally to any required angle between 0–90° around a horizontal axis.

FIG. 8 shows the hight 30 and length 31 of the cushions in the vertical direction in said fig.

The possibility of providing permanently deformed, possibly gas-filled and pressurized, cushions or bladders improves drastically the protecting ability of the wrapping. Even if one or several bladders are punctured, such bladders maintain a shock-absorbing capacity also after being depressurized because the punctured bladder acts as a shock-absorber from which gas has to be pumped out through the punctured areas. Basically, the thermoforming procedure does also allow a 100% tailored piece of cushion band for a specific shock-absorbing purpose, meaning that the wrapping will act at an optimum irrespective of the shape of the article on which it is fastened.

We claim:

1. A shock-absorbing wrapper comprising first and second longitudinally extending webs, said first and second longitudinal webs being connected at an intermediate longitudinally extending area, said first longitudinally extending web including first and second longitudinally extending rows of permanently thermoformed gas filled recesses with a minimum degree of mechanical memory, said first and second longitudinally extending rows of permanently thermoformed recesses being on either side of said intermediate longitudinally extending area, said intermediate longitudinally extending area having a transverse dimension sufficiently large to permit said shock-absorbing wrapper to be folded along said intermediate longitudinally extending area such that said first and second longitudinally extending rows of thermoformed recesses can be juxtaposed with each other.

2. The shock-absorbing wrapper of claim 1 wherein each of said first and second longitudinally extending rows of thermoformed recesses comprises thermoformed recesses of the same size.

3. The shock absorbing wrapper of claim 1 wherein said first and second longitudinally extending rows of thermoformed recesses comprises thermoformed recesses of different sizes.

* * * * *